United States Patent
Kimata et al.

(10) Patent No.: US 6,810,724 B2
(45) Date of Patent: Nov. 2, 2004

(54) ENGINE REVERSING DETECTION SYSTEM FOR OUTBOARD MOTOR

(75) Inventors: Ryuichi Kimata, Wako (JP); Kazuhiro Satoh, Wako (JP); Nobuhiro Takahashi, Takanezawa-machi (JP)

(73) Assignees: Honda Giken Kogyo Kabushiki Kaisha, Tokyo (JP); Keihin Corporation, Tokyo (JP)

( * ) Notice: Subject to any disclaimer, the term of this patent is extended or adjusted under 35 U.S.C. 154(b) by 1 day.

(21) Appl. No.: 10/267,829

(22) Filed: Oct. 10, 2002

(65) Prior Publication Data
US 2003/0106364 A1 Jun. 12, 2003

(30) Foreign Application Priority Data
Oct. 12, 2001 (JP) .......................................... 2001-315852

(51) Int. Cl.[7] .............................................. G01M 15/00
(52) U.S. Cl. ......................................... 73/116; 324/165
(58) Field of Search ............................... 73/116, 117.2, 73/117.3, 118.1; 324/165

(56) References Cited

U.S. PATENT DOCUMENTS

| | | | | |
|---|---|---|---|---|
| 3,728,565 A | * | 4/1973 | O'Callaghan | 310/168 |
| 4,142,152 A | * | 2/1979 | Fincher | 324/165 |
| 4,142,153 A | * | 2/1979 | Smith | 324/165 |
| 4,331,917 A | * | 5/1982 | Render et al. | 324/166 |
| 4,370,614 A | * | 1/1983 | Kawada et al. | 324/173 |
| 4,558,591 A | * | 12/1985 | Francis et al. | 73/116 |
| 4,972,332 A | * | 11/1990 | Luebbering et al. | 702/145 |
| 5,079,945 A | * | 1/1992 | Hansen et al. | 73/116 |
| 5,086,272 A | * | 2/1992 | Hinrichsen | 324/207.13 |
| 5,264,789 A | * | 11/1993 | Braun et al. | 324/165 |
| 5,371,460 A | * | 12/1994 | Coffman et al. | 324/165 |
| 5,446,376 A | * | 8/1995 | Porter et al. | 324/165 |
| 5,523,679 A | * | 6/1996 | Kalb | 324/165 |
| 5,719,496 A | * | 2/1998 | Wolf | 324/165 |
| 5,977,764 A | * | 11/1999 | Riedle et al. | 324/165 |
| 5,977,765 A | * | 11/1999 | Gibson et al. | 324/165 |
| 6,034,525 A | * | 3/2000 | Koerner et al. | 324/165 |
| 6,320,374 B1 | * | 11/2001 | Schroeder et al. | 324/207.25 |
| 6,324,488 B1 | * | 11/2001 | Siegl | 702/151 |
| 6,639,399 B2 | * | 10/2003 | Schroeder et al. | 324/207.25 |
| 6,650,110 B2 | * | 11/2003 | Schroeder et al. | 324/207.22 |
| 2003/0106365 A1 | * | 6/2003 | Satoh et al. | 73/118.1 |

FOREIGN PATENT DOCUMENTS

JP                 62-182463           8/1987

* cited by examiner

*Primary Examiner*—Eric S. McCall
(74) *Attorney, Agent, or Firm*—Westerman, Hattori, Daniels & Adrian, LLP

(57) ABSTRACT

A system for detecting reverse rotation of a 4-cycle, internal combustion engine with three or more cylinder for an outboard motor mounted on a boat, whose output is connected to a propeller such that the boat is propelled forward or reverse. In the system, it is determined whether a counted value of crank angle signals generated once every 30 crank angles is a multiple of a predetermined number (e.g., four in six cylinders), when the cylinders are identified and it is determined that engine rotates reverse when the counted value is determined to be not the multiple and the engine is immediately stopped. With this, it becomes possible to accurately detect the reverse rotation of the engine and prevent its further reverse rotation.

10 Claims, 9 Drawing Sheets

ENGINE REVERSING DETECTION SYSTEM FOR OUTBOARD MOTOR

BACKGROUND OF THE INVENTION

1. Field of the Invention

This invention relates to an engine reversing detection system for an outboard motor, more particularly to a system for detecting reverse rotation of an internal combustion engine for an outboard motor for small boats.

2. Description of the Related Art

Small motor-driven boats are generally equipped with a propulsion unit including an internal combustion engine, propeller shaft and propeller integrated into what is called an outboard motor or engine. The outboard motor is mounted on the outside of the boat and the output of the engine is transmitted to the propeller through a clutch and the propeller shaft. The boat can be propelled forward or backward by moving the clutch from Neutral to Forward or Reverse position.

Specifically, the clutch is usually composed of a drive gear that rotates unitarily with the engine drive shaft when the engine is running, a forward gear, a reverse gear, and a dog (sliding clutch) located between the forward and reverse gears that rotates unitarily with the propeller shaft. The forward and reverse gears are engaged with the drive gear and rotate idly in opposite directions on the propeller shaft.

Since the outboard engine is connected to the propeller through the clutch of a relatively simple mechanism, when the engine speed is low and the engine output is small, for example, at the time of stopping the boat, the engine may sometimes driven by the propeller to rotate reverse. Here, "rotate reverse" indicates that the engine crankshaft rotates in a direction opposite to the predetermined direction such that the exhaust pipe in water functions as the intake pipe. If this happens, the exhaust pipe sucks sea (lake) water which may disadvantageously enter the cylinders, etc. The reverse rotation of the engine should preferably be detected.

In order to solve the problem, Japanese Laid-Open Patent Application No. Sho 62 (1987)-182463 teaches detecting the reverse rotation of a two-cycle, two-cylinder engine, using two sensors comprising a first sensor which generates a reference signal (TDC signal) at BTDC10 degrees of each cylinder and a second sensor which generates a unit crank angle signal at 15 degrees (in crank angle) obtained by dividing the interval of the reference signals by 12, and a counter which counts the number of the crank angle signals until it is reset by the reference signal. In the technique, the reverse rotation is detected when the counted value is not 12 and if the reverse rotation is detected, the engine is stopped.

Since, however, the prior art relates to the detection of reverse rotation in a two-cycle engine having only two cylinders, this technique can not immediately be applied to a four-cycle engine having three more cylinders, e.g., a six-cylinder engine.

SUMMARY OF THE INVENTION

An object of the present invention is therefore to solve the problem by providing an engine reversing detection system for an outboard motor, which can accurately detect reverse rotation of a four-cycle engine having three or more cylinders.

For realizing this object, there is provided a system for detecting reverse rotation of a 4-cycle internal combustion engine having three or more cylinders for an outboard motor mounted on a boat, whose output is connected to a propeller such that the boat is propelled forward or reverse, comprising: cylinder identifying means for identifying the cylinders of the engine; crank angle pulse generating means for generating a predetermined number of crank angle signals in a predetermined range of crank angles; counting means for counting the number of the crank angle singles; multiple count determining means for determining whether the counted value is a multiple of the predetermined number, when the cylinders are identified; and engine reversing determining means for determining that engine rotates reverse when the counted value is determined to be not the multiple of the predetermined number and for stopping the engine.

BRIEF DESCRIPTION OF THE DRAWINGS

The object and advantages of the invention will be made apparent with reference to the following descriptions and drawings, in which.

DETAILED DESCRIPTION OF THE PREFERRED EMBODIMENT

An engine reversing detection system of an internal combustion engine for an outboard motor according to an embodiment of the present invention will now be explained with reference to the attached drawings.

Figure 1:
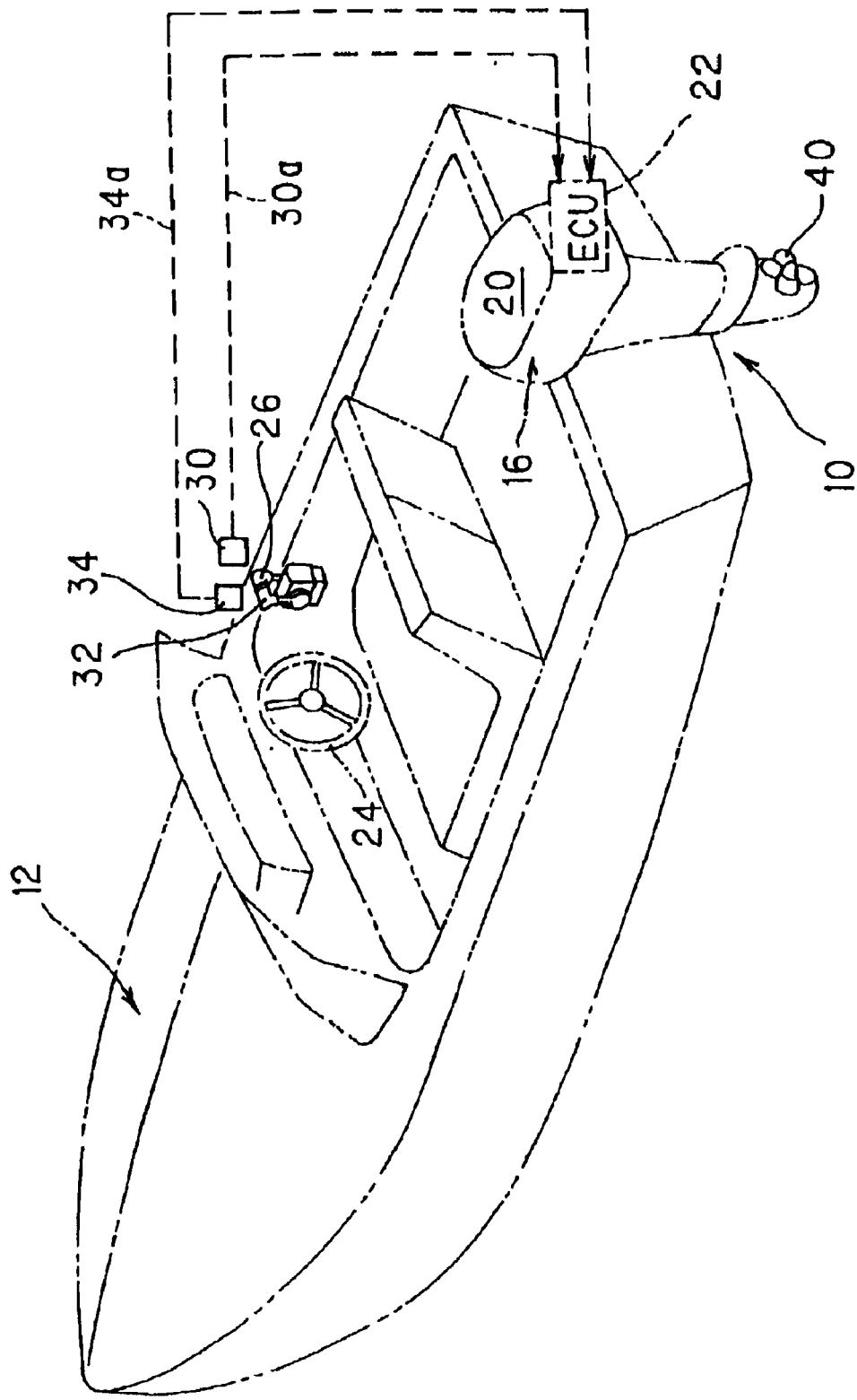
FIG. 1 is a schematic view showing the overall configuration of an engine reversing detection system for an outboard motor equipped with an internal combustion engine according to an embodiment of the present invention.
Figure 2:
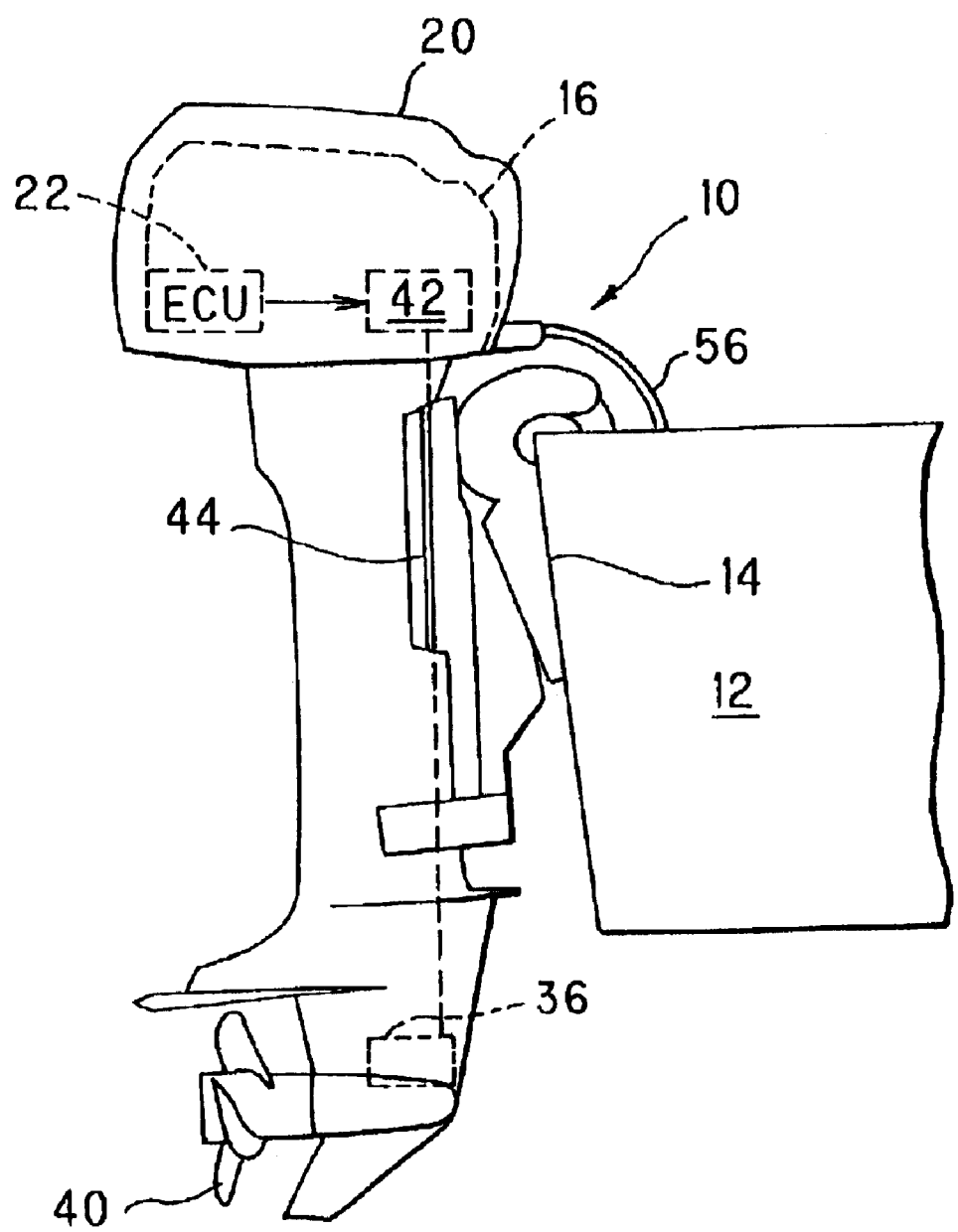
FIG. 2 is an enlarged side view of one portion of FIG. 1.

FIG. 1 is a schematic view showing the overall configuration of the engine reversing detection system of an internal combustion engine for an outboard motor and FIG. 2 is an enlarged side view of one portion of FIG. 1.

Reference numeral 10 in FIGS. 1 and 2 designates the aforesaid propulsion unit including an internal combustion engine, propeller shaft and propeller integrated into what is hereinafter called an "outboard motor." The outboard motor 10 is mounted on the stern of a boat (small craft) 12 by a clamp unit 14 (see FIG. 2).

As shown in FIG. 2, the outboard motor 10 is equipped with the internal combustion engine (hereinafter called the "engine") 16. The engine 16 is a spark-ignition four-cycle, V-6 gasoline engine which has three cylinders at each of left and right banks. The engine is positioned above the water surface and is enclosed by an engine cover 20 of the outboard motor 10. An electronic control unit (ECU) 22 composed of a microcomputer is installed near the engine 16 enclosed by the engine cover 20.

As shown in FIG. 1, a steering wheel 24 is installed in the cockpit of the boat 12. When the operator turns the steering wheel 24, the rotation is transmitted to a rudder (not shown) fastened to the stern through a steering system not visible in the drawings, changing the direction of boat advance.

A throttle lever 26 is mounted on the right side of the cockpit and near it is mounted a throttle lever position sensor 30 that outputs a signal corresponding to the position of the throttle lever 26 set by the operator.

A shift lever 32 is provided adjacent to the throttle lever 26 and next to it is installed a neutral switch 34 that outputs an ON signal when the operator puts the shift lever 32 in Neutral and outputs an OFF signal when the operator puts the shift lever 32 in Forward or Reverse. The outputs from the throttle lever position sensor 30 and neutral switch 34 are sent to the ECU 22 through signal lines 30a and 34a.

The output of the engine 16 is transmitted through a crankshaft and a drive shaft (neither shown) to a clutch 36 of the outboard engine 10 located below the water surface. The clutch 36 is connected to a propeller 40 through a propeller shaft (not shown).

The clutch 36, which comprises a conventional gear mechanism, is omitted from the drawing. It is composed of a drive gear that rotates unitarily with the drive shaft when the engine 16 is running, a forward gear, a reverse gear, and a dog (sliding clutch) located between the forward and reverse gears that rotates unitarily with the propeller shaft. The forward and reverse gears are engaged with the drive gear and rotate idly in opposite directions on the propeller shaft.

The ECU 22 is responsive to the output of the neutral switch 34 received on the signal line 34a for driving an actuator (electric motor) 42 via a drive circuit (not shown) so as to realize the intended shift position. The actuator 42 drives the dog through a shift rod 44.

When the shift lever 32 is put in Neutral, the engine 16 and the propeller shaft are disconnected and can rotate independently. When the shift lever 32 is put in Forward or Reverse position, the dog is engaged with the forward gear or the reverse gear and the rotation of the engine 16 is transmitted through the propeller shaft to the propeller 40 to drive the propeller 40 in the forward direction or the opposite (reverse) direction and thus propel the boat 12 forward or backward.

The engine 16 will now be explained with reference to FIGS. 3 and 4.

Figure 3:
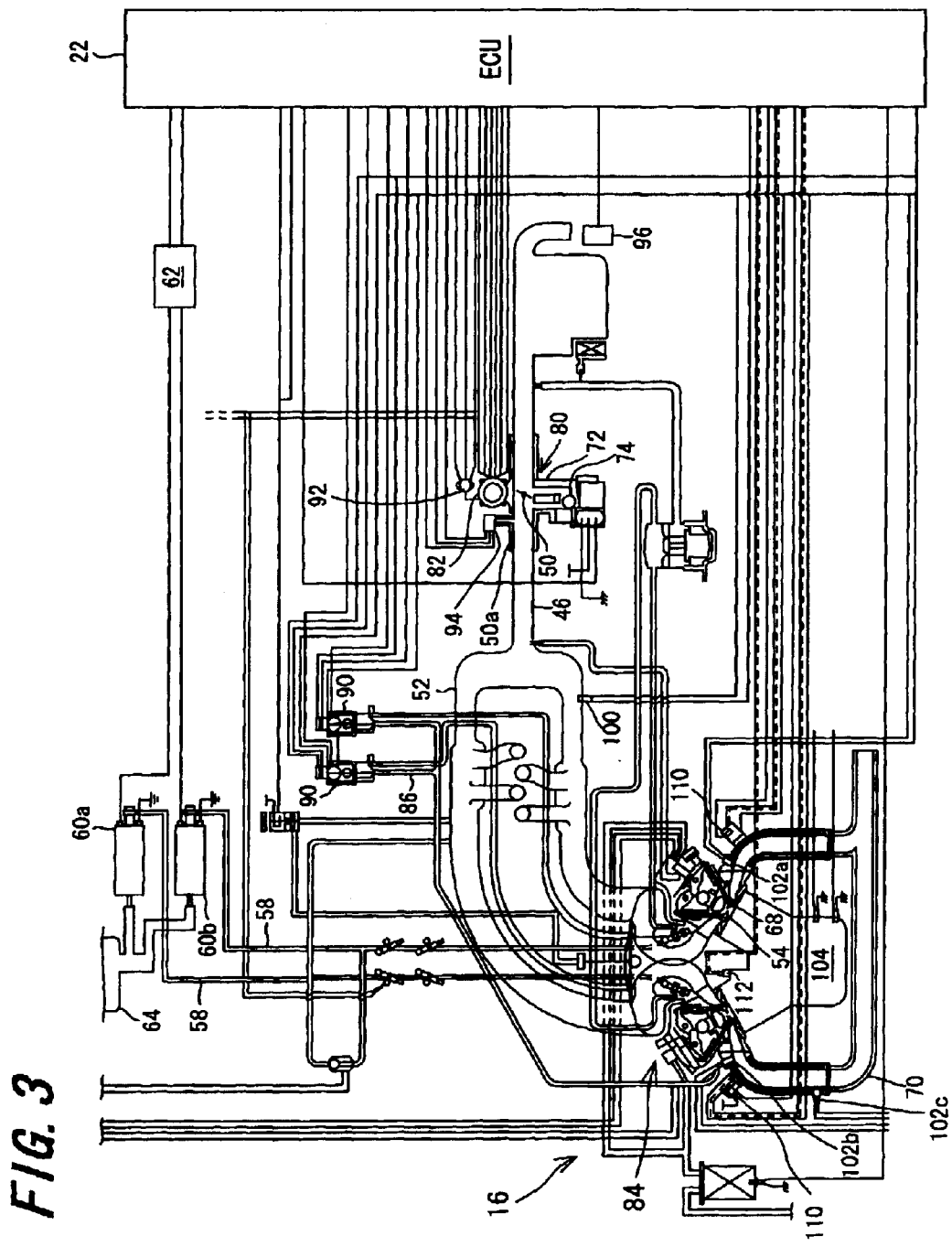
FIG. 3 is a schematic diagram showing details of the engine of the motor shown in FIG. 1.

As shown in FIG. 3, the engine 16 is equipped with an air intake pipe 46. Air drawn in through an air cleaner (not shown) is supplied to intake manifolds 52 provided one for each of left and right cylinder banks disposed in V-like shape as viewed from the front, while the flow thereof is adjusted by a throttle valve 50, and finally reaches an intake valves 54 of the respective cylinders. An injector 56 (not shown in FIG. 3) is installed in the vicinity of each intake valve (not shown) for injecting fuel (gasoline).

The injectors 56 are connected through two fuel lines 58 provided one for each cylinder bank to a fuel tank (not shown) containing gasoline. The fuel lines 58 pass through separate fuel pumps 60a and 60b equipped with electric motors (not shown) that are driven via a relay circuit 62 so as to send pressurized gasoline to the injectors 56. Reference numeral 64 designates a vaporized fuel separator.

The intake air is mixed with the injected gasoline to form an air-fuel mixture that passes into the combustion chamber (not shown) of each cylinder, where it is ignited by a spark plug 66 (not shown in FIG. 3) to burn explosively and drive down a piston (not shown). The so-produced engine output is taken out through a crankshaft. The exhaust gas produced by the combustion passes out through exhaust valves 68 into exhaust manifolds 70 provided one for each cylinder bank and is discharged to the exterior of the engine.

As illustrated, a branch passage 72 for secondary air supply is formed to branch off from the air intake pipe 46 upstream of the throttle valve 50 and rejoin the air intake pipe 46 downstream of the throttle valve 50. The branch passage 72 is equipped with an electronic secondary air control valve (EACV) 74.

The EACV 74 is connected to the ECU 22. The ECU 22 calculates a current command value that it supplies to the EACV 74 so as to drive the EACV 74 for regulating the opening of the branch passage 72. The branch passage 72 and the EACV 74 thus constitute a secondary air supplier 80 for supplying secondary air in proportion to the opening of the EACV 74.

The throttle valve 50 is connected to an actuator (stepper motor) 82. The actuator 82 is connected to the ECU 22. The ECU 22 calculates a current command value proportional to the output of the throttle lever position sensor 30 and supplies it to the actuator 82 through a drive circuit (not shown) so as to regulate the throttle opening or position TH.

More specifically, the actuator 82 is directly attached to a throttle body 50a housed in the throttle valve 50 with its rotating shaft (not shown) oriented to be coaxial with the throttle valve shaft. In other words, the actuator 82 is attached to the throttle body 50a directly, not through a linkage, so as to simplify the structure and save mounting space. Thus, in this embodiment, the push cable is eliminated and the actuator 82 is directly attached to the throttle body 50a for driving the throttle valve 50.

The engine 16 is provided in the vicinity of the intake valves 54 and the exhaust valves 68 with a variable valve timing system 84. When engine speed and load are relatively high, the variable valve timing system 84 switches the valve open time and lift to relatively large values (Hi V/T). When the engine speed and load are relatively low, it switches the valve open time and lift to relatively small values (Lo V/T).

The exhaust system and the intake system of the engine 16 are connected by EGR (exhaust gas recirculation) passages 86 provided therein with EGR control valves 90. Under predetermined operating conditions, a portion of the exhaust gas is returned to the air intake system.

The actuator 82 is connected to a throttle position sensor 92 responsive to rotation of the throttle shaft for outputting a signal proportional to the throttle opening or position TH. A manifold absolute pressure sensor 94 is installed downstream of the throttle valve 50 for outputting a signal proportional to the manifold absolute pressure PBA in the air intake pipe (engine load). In addition, an atmospheric air pressure sensor 96 is installed near the engine 16 for outputting a signal proportional to the atmospheric air pressure PA.

An intake air temperature sensor 100 installed downstream of the throttle valve 50 outputs a signal proportional to the intake air temperature TA. A first temperature sensor 102a and a second temperature sensor 102b each installed at cooling passages (not shown) connected to the water inlet (not shown) via a thermostat (not shown) of the left and right cylinder banks, output signals indicative of the temperature at those locations, and a third temperature sensor 102c installed in the exhaust manifolds 70 of one of the left and right cylinder banks outputs a signal indicative of the engine temperature TOH and the engine coolant temperature TW. Thus, the three temperature sensors 102a, 102b and 102c function as the sensors for detecting the engine temperature TOH and the engine coolant temperature TW.

$O_2$ sensors 110 installed in the exhaust manifolds 70 output signals reflecting the oxygen concentration of the exhaust gas. A knock sensor 112 installed at a suitable location on the cylinder block 104 outputs a signal related to knock.

Figure 4:
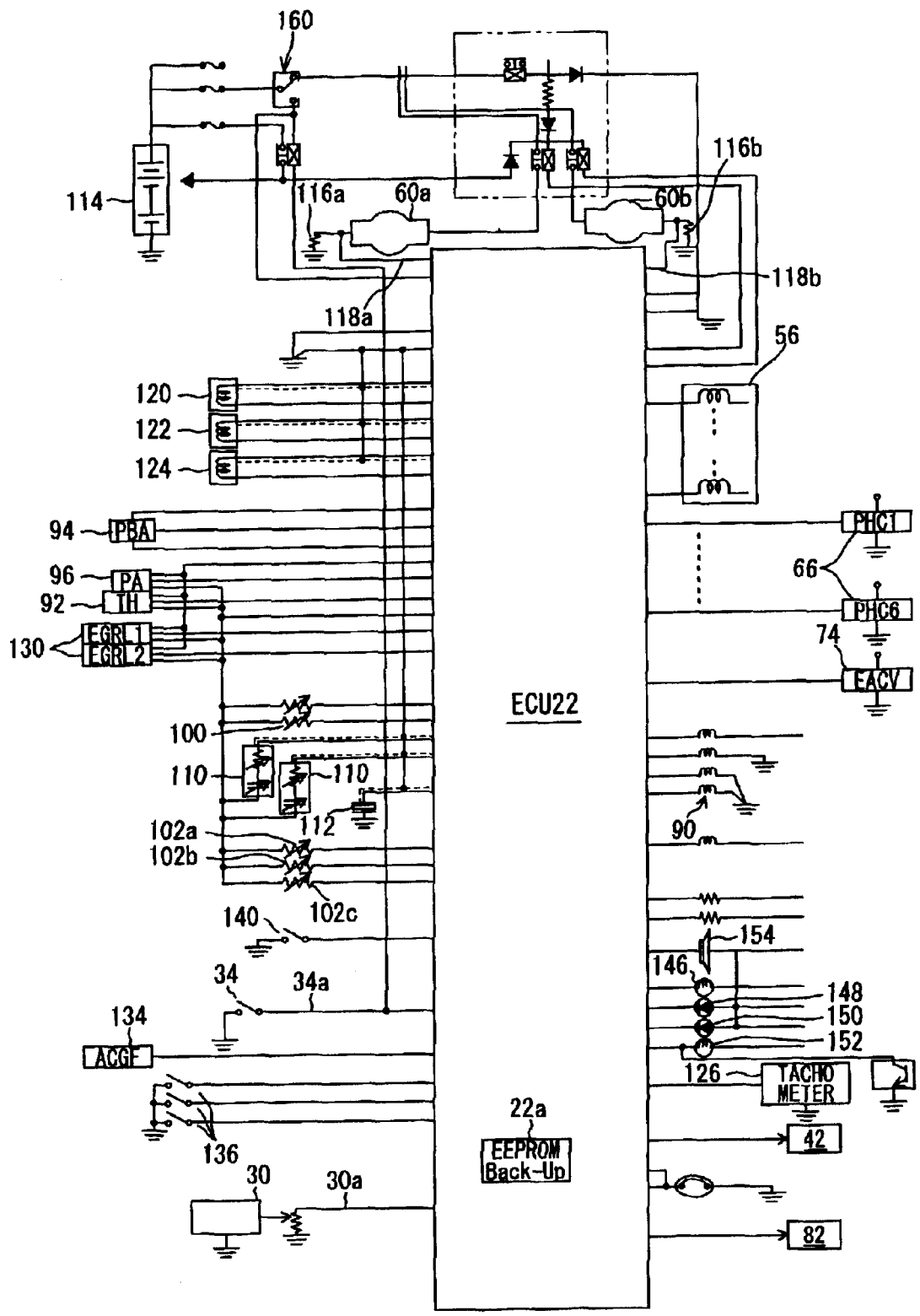
FIG. 4 is a block diagram setting out the particulars of inputs/outputs to and from the electronic control unit (ECU) shown in FIG. 1.

The explanation of the outputs of the sensors and the inputs/outputs to/from the ECU 22 will be continued with reference to FIG. 4. Some sensors and signal lines do not appear in FIG. 3.

The motors of the fuel pumps 60a and 60b are connected to an onboard battery 114 and detection resistors 116a and 116b are inserted in the motor current supply paths. The voltages across the resistors are input to the ECU 22 through signal lines 118a and 118b. The ECU 22 determines the amount of current being supplied to the motors from the voltage drops across the resistors and uses the result to discriminate whether any abnormality is present in the fuel pumps 60a and 60b.

A first TDC (top dead center) sensors 120 and a second TDC sensor 122 and a crank angle sensor 124 are installed near the engine crankshaft. The first and second TDC sensors produce a signal (pulse) at or near the TDC position, precisely at a predetermined crank angle position near the TDC position, more precisely at BTDC 10 degrees (10 degrees Before Top Dead Center) of each cylinder piston. The crank angle sensor 124 produces a signal (pulse) once every prescribed crank angles, i.e. 30 degrees. The ECU 22 identifies the cylinder from the signals sent from the first and second TDC sensors as will be explained later and calculates the engine speed NE from the output of the crank angle sensor.

Lift sensors 130 installed near the EGR control valves 90 produce and send to the ECU 22 signals related to the lifts (valve openings) of the EGR control valves 90.

The output of the F terminal (ACGF) 134 of an AC generator (not shown) is input to the ECU 22. Three hydraulic (oil pressure) switches 136 installed in the hydraulic circuit (not shown) of the variable valve timing system 84 produce and output to the ECU 22 a signal related to the detected hydraulic pressure. A hydraulic switch 140 installed in the hydraulic circuit (not shown) of the engine 16 produces and outputs to the ECU 22 a signal related to the detected hydraulic pressure.

The ECU 22, which is composed of a microcomputer as mentioned earlier, is equipped with an EEPROM (electrically erasable and programmable read-only memory) 22a for back-up purposes. The ECU 22 uses the foregoing inputs to detect overheat, ECU failure and hydraulic pressure abnormality and if detected, turns any of warning lamp 146, 148, 150, 152 and sounds a buzzer 154 to warn the operator.

The operation of the illustrated engine reversing detection system for an outboard motor will now be explained.

Figure 5:
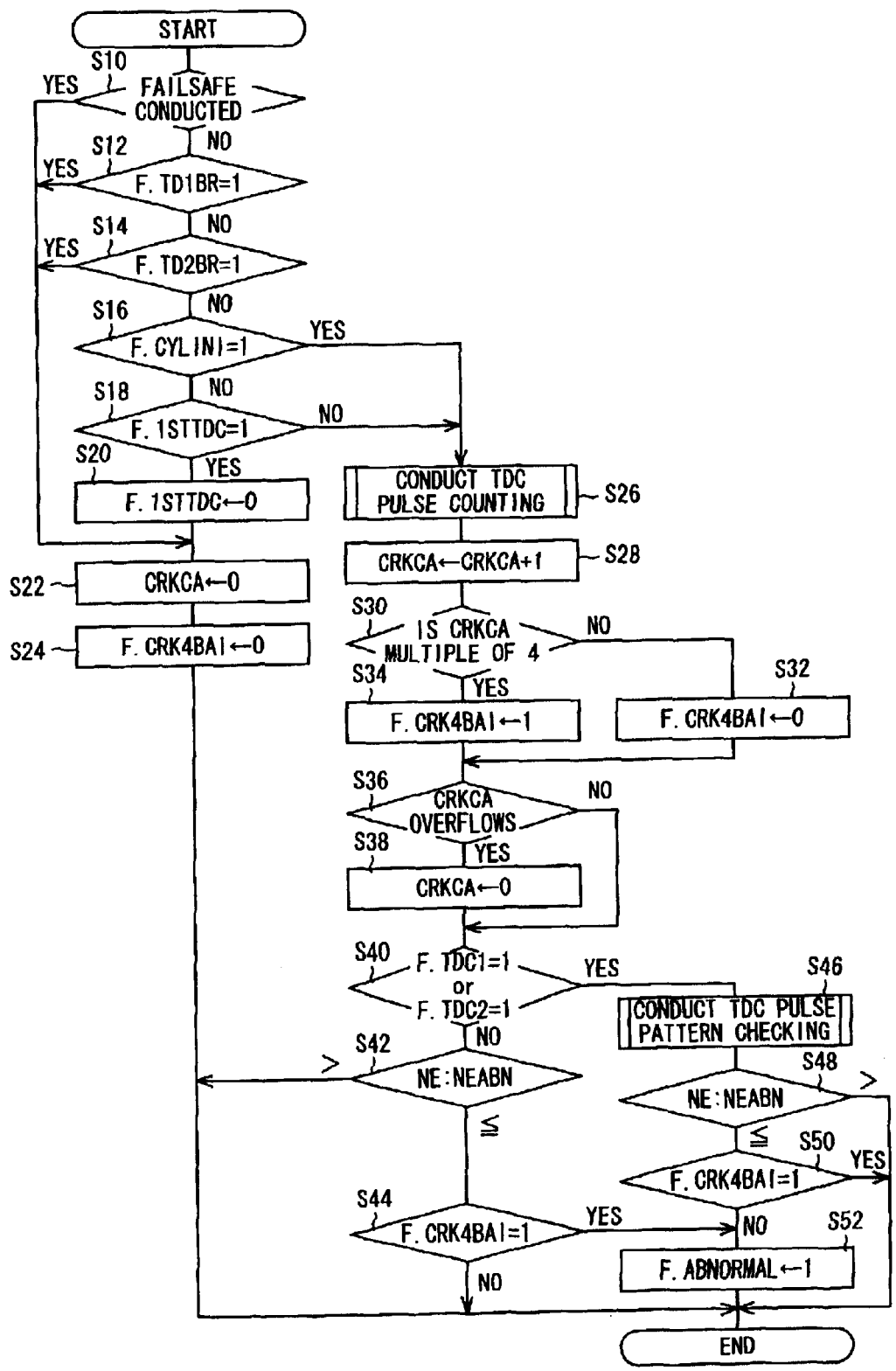
FIG. 5 is a flow chart showing the operation of the system illustrated in FIG. 1.
Figure 6:
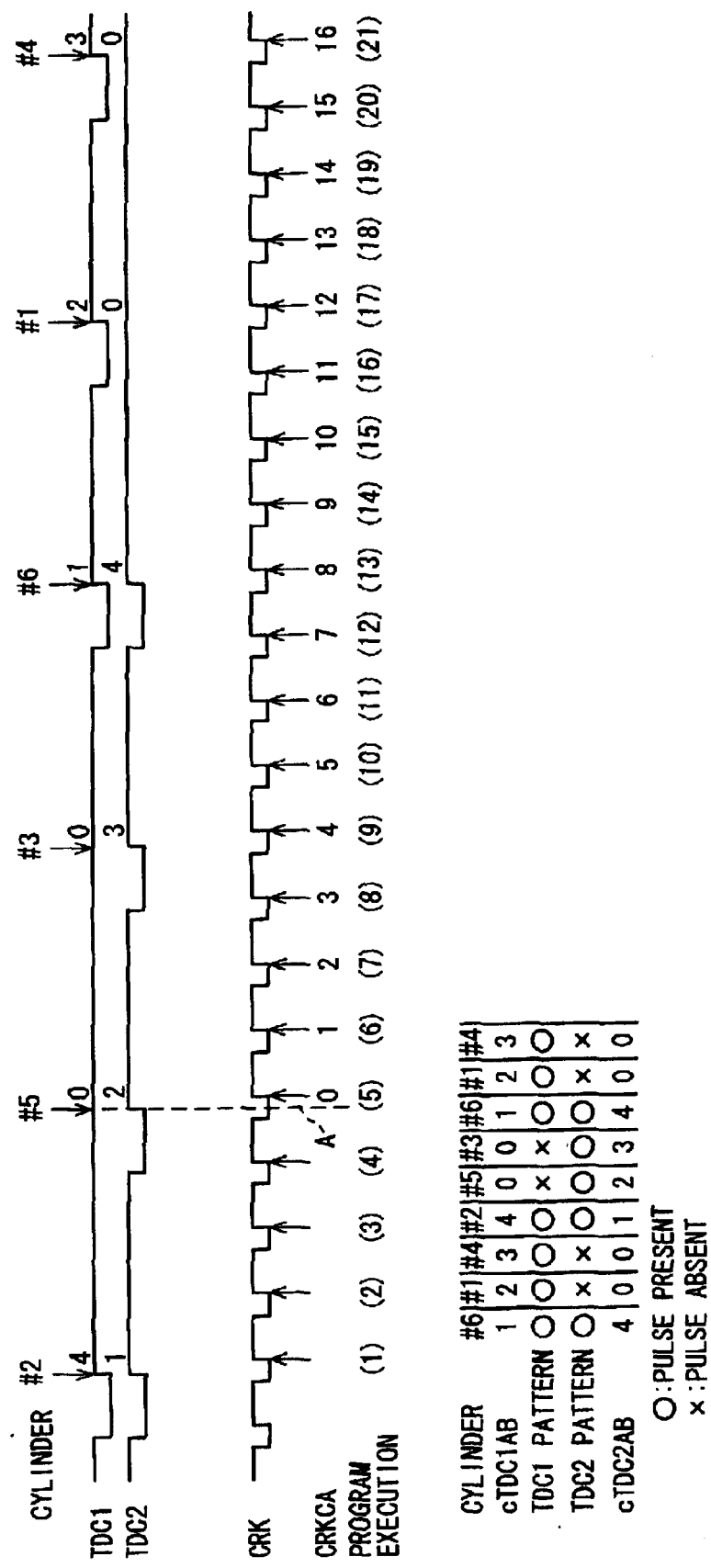
FIG. 6 is a time chart explaining the operation of the system illustrated in the flow chart of FIG. 5.

FIG. 5 is a flow chart showing the operation and FIG. 6 is a time chart explaining the operation. The illustrated program is executed when an ignition switch (indicated by reference numeral 160 in FIG. 4) is turned to the ACC position whereafter it is looped at the rising (leading) edge of the pulse (signal) generated by the crank angle sensor at each 30 crank angle degrees., i.e., is thus looped at every 30 crank angles.

Before entering the explanation of the flow chart of FIG. 5, the outputs of the sensors are explained with reference to the time chart of FIG. 6. In the engine 16 illustrated, the three cylinders mounted on one bank are defined as the 1st, the 2nd and the 3rd, while those mounted on another bank are defined as the 4th, the 5th and the 6th cylinder. The firing order is defined as the 1st, 4th, 2nd, 5th, 3rd and 6th cylinder.

As illustrated, the first TDC sensor 120 (illustrated as "TDC1" in this time chart) generates a pulse (TDC signal; first signal) which rises at BTDC 10 degrees of the 2nd, 6th, 1st and 4th, in other words it generates the signal for the cylinders except for at least one predetermined cylinder, more precisely except for two (3rd and 5th) cylinders. The second TDC sensor 122 (illustrated as "TDC2") generates a pulse (TDC signal; second signal) which rises at BTDC 10 degrees of the 2nd, 5th, 3rd and 6th, in other words it generates the signal for the cylinders except for at least the predetermined cylinder).

The crank angle sensor 124 generates a pulse (crank angle signal) which rises at 30 degrees obtained by dividing the 120 degree intervals (defined by the sensors 120, 122) by 4. Thus, the crank angle sensor 124 generates a predetermined number of crank angle signals (i.e., 4) in a predetermined range of crank angles (i.e., 120 degrees). Hereinafter, the pulse generated by the first TDC sensor 120 is referred to as "TDC1 pulse", the pulse generated by the second TDC sensor 122 is referred to as "TDC2 pulse", and the pulse generated by the crank angle sensor 124 is referred to as "crank angle pulse".

As shown in the time chart, the crank angle signal is generated such that its leading (rising) edge is delayed from that of the TDC signal by a prescribed angle value. Since the program of the FIG. 5 flow chart is executed at each crank angle pulse's leading edge, it become possible to obtain pattern of TDC1, 2 illustrated at the bottom of the time chart, each time the program is executed. Accordingly, when the presence/absence of pulses are shown by a circle and a cross in the pattern, a cylinder can be easily identified from the pattern of at least two cylinders.

Based on the above, the flow chart of FIG. 5 will be explained.

The program begins in S10 in which it is determined whether a failsafe processing has been conducted and if the result is negative, the program proceeds to S12 in which it is determined whether the bit of a flag F.TD1BR is set to 1. The bit of this flag is set to 1 in a routine (not shown) when a failure of wire breaking has happened in the first TDC sensor 120.

When the result in S12 is negative, the program proceeds to S14 in which it is determined whether the bit of a flag F.TD2 BR is set to 1. The bit of this flag is also set to 1 in a routine (not shown) when a failure of wire breaking has happened in the second TDC sensor 122.

When the result in S14 is negative, the program proceeds to S16 in which it is determined whether the bit of a flag F.CYLINI is set to 1. The bit of this flag is set to 1 in a routine (not shown) when the aforesaid cylinder identification is completed.

Assuming that this program is executed at position (1) illustrated in the time chart of FIG. 6, the result in S16 is negative and the program proceeds to S18 in which it is determined whether the bit of a flag F.1STTDC is set to 1. This flag is used for confirming whether the TDC1 pulse (or TDC2 pulse) has been inputted and its bit is set to 1 in a routine (not shown) when the TDC1 pulse (or TDC2 pulse) is inputted (generated) for the first time.

In this situation, the result in S18 is normally affirmative and the program proceeds to S20 in which the bit of the flag is reset to 0, and to S22 in which the value of a counter CRKCA (up counter; explained later) is reset to zero. The program then proceeds to S24 in which the bit of a flag F.CRK4BAI (explained later) is reset to 0 and the program is terminated. When the result in any of S10 to S14 is affirmative, the program skips S16 to S20.

Assuming that the program is again executed at position (2) in the time chart, the result in S16 is again negative and the program proceeds to S18 where the result is negative, and to S26 in which a TDC pulse counting is conducted.

Figure 7:
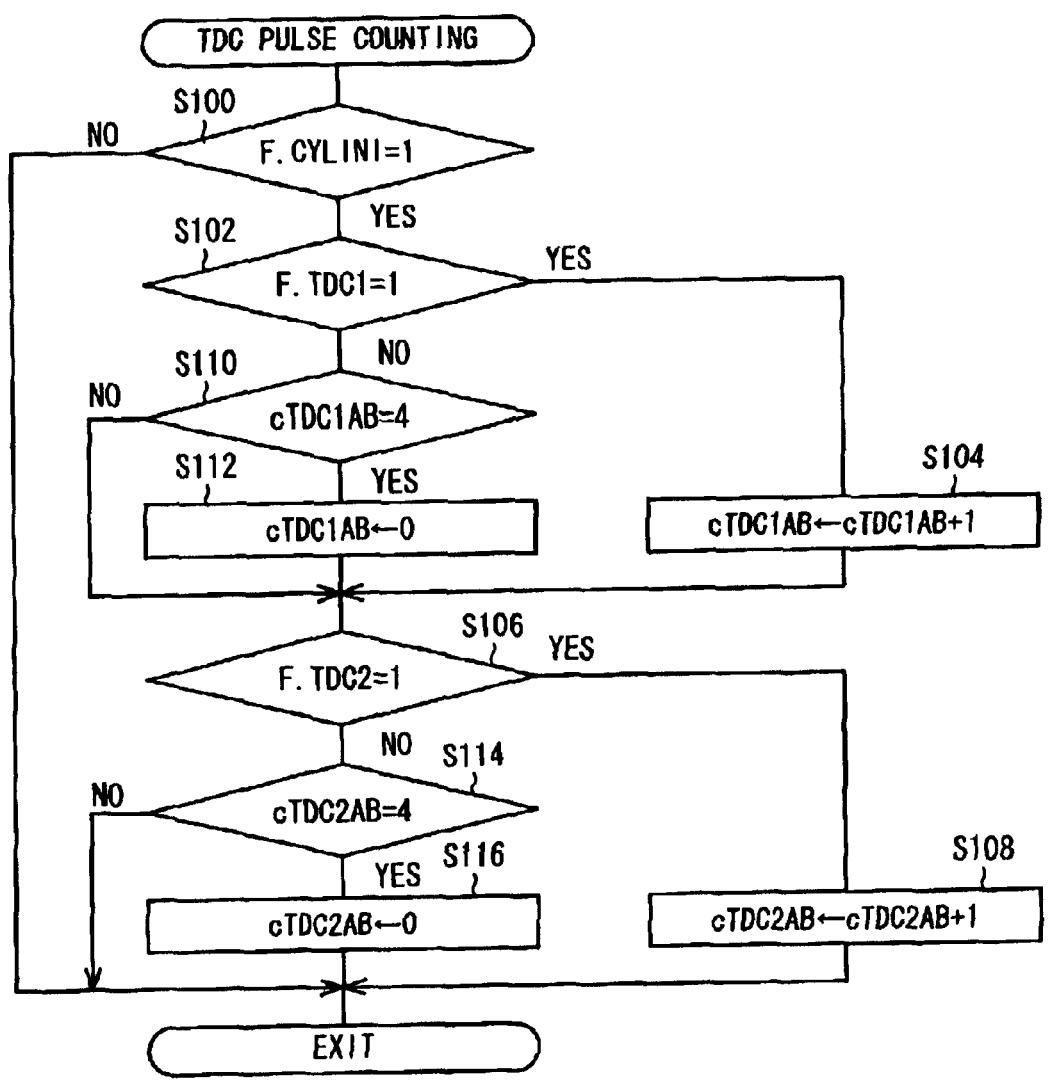
FIG. 7 is a flow chart showing the subroutine of a TDC pulse counting referred to in the flow chart of FIG. 5.

FIG. 7 is a flow chart showing the subroutine of the TDC pulse counting.

The program begins in S100 in which it is again determined whether the bit of the flag F.CYLINI is set to 1 and when the result is negative, the program is terminated.

The above will be repeated when the program is executed at positions (3) and (4) in the time chart.

When the program is again, executed at position (5) in the time chart, since the pattern of two cylinders was obtained and the cylinder identification was finished at time point (marked by "A"), the result in S16 becomes affirmative and the program proceeds to S100, via S26, where the result becomes affirmative and the program proceeds to S102 in which it is determined whether the bit of a flag F.TDC1 is set to 1. The bit of this flag is set to 1 in a routine (not shown) when the TDC1 generates TDC1 pulse.

Since the program was executed at (5) in the time chart, the result is normally affirmative and the program proceeds to S104 in which the value of a counter cTDC1AB is incremented by one. As shown at the bottom of the time chart, the counter is incremented each time the TDC1 pulse is inputted (generated).

The program then proceeds to S106 in which it is determined whether the bit of a flag F.TDC2 is set to 1. Since the bit of this flag is set to 1 in a routine (not shown) when the TDC2 generates TDC2 pulse, the result is normally affirmative and the program proceeds to S108 in which a counter cTDC2AB is incremented by one. As shown at the bottom of the time chart, this counter is similarly incremented each time the TDC2 pulse is inputted (generated).

When the program is executed at position (12) in the time chart, for example, the result in S102 is negative and the program proceeds to S110 in which it is determined whether the value of the counter cTDC1AB has reached 4. If the result is affirmative, the program proceeds to S112 in which the counter value is reset to zero. When the result is negative, the program skips S112.

Or when the program is executed at position (8) in the time chart, for example, the result in S106 is negative and the program proceeds to S114 in which it is determined whether the value of the counter cTDC2AB has reached 4. If the result is affirmative, the program proceeds to S116 in which the counter value is reset to zero. When the result is negative, the program skips S116.

Returning to the explanation of the flow chart of FIG. 5, the program then proceeds to S28 in which the counter CRKCA is incremented by one. This counter is used for counting the number of crank angle pulses and as illustrated at the time chart of FIG. 6, after the cylinder identification has been finished, each time the program is executed at the crank angle pulse rising edge, it is incremented in S28 and counts the number of crank angle pulses. As will be understood from the time chart, the counter value is not reset by the TDC1 pulse or TDC2 pulse.

The program then proceeds to S30 in which it is determined whether the value of the counter CRKCA is a multiple of 4. When the program is executed at any position among from (5) to (8), the result is normally negative and the program proceeds to S32 in which the bit of the flag F.CRK4BAI is reset to 0. On the other hand, when the program is executed at (9), for example, the result is affirmative and the program proceeds to S34 in which the bit of the flag F.CRK4BAI is set to 1.

The program then proceeds to S36 in which it is determined whether the value of the counter CRKCA overflows. When the result is affirmative, the program proceeds to S38 in which the counter value is reset to zero. When the result in S36 is negative, the program skips S38. The program then proceeds to S40 in which it is determined whether the bit of the flag F.TDC1 or F.TDC2 is set to 1.

The result is negative when the program is executed at position (12) in the time chart and the program proceeds to S42 in which the detected engine speed NE is compared with a predetermined value NEABN (e.g., 650 rpm). to determine whether the detected engine speed exceeds the predetermined value. When it is determined that the detected engine speed exceeds the predetermined value, the program is terminated. When it is determined that the detected engine speed is equal to or less than the predetermined value, the program proceeds to S44 in which it is determined whether the bit of the flag F.CRK4BAI is set to 1.

when the program is executed at position (12) in the time chart, for example, since the counter value is not the multiple of 4 and the bit of the flag F.CRK4BAI is not set to 1, if the result in S44 is negative, it is determined that no reverse rotation has happened in the engine 16 and the engine operation is normal, and the program is immediately terminated.

On the contrary, when the program is executed at position (13) in time chart, for example, the result in S40 is affirmative and the program proceeds to S46 in which a TDC pulse pattern checking is conducted.

Figure 8:
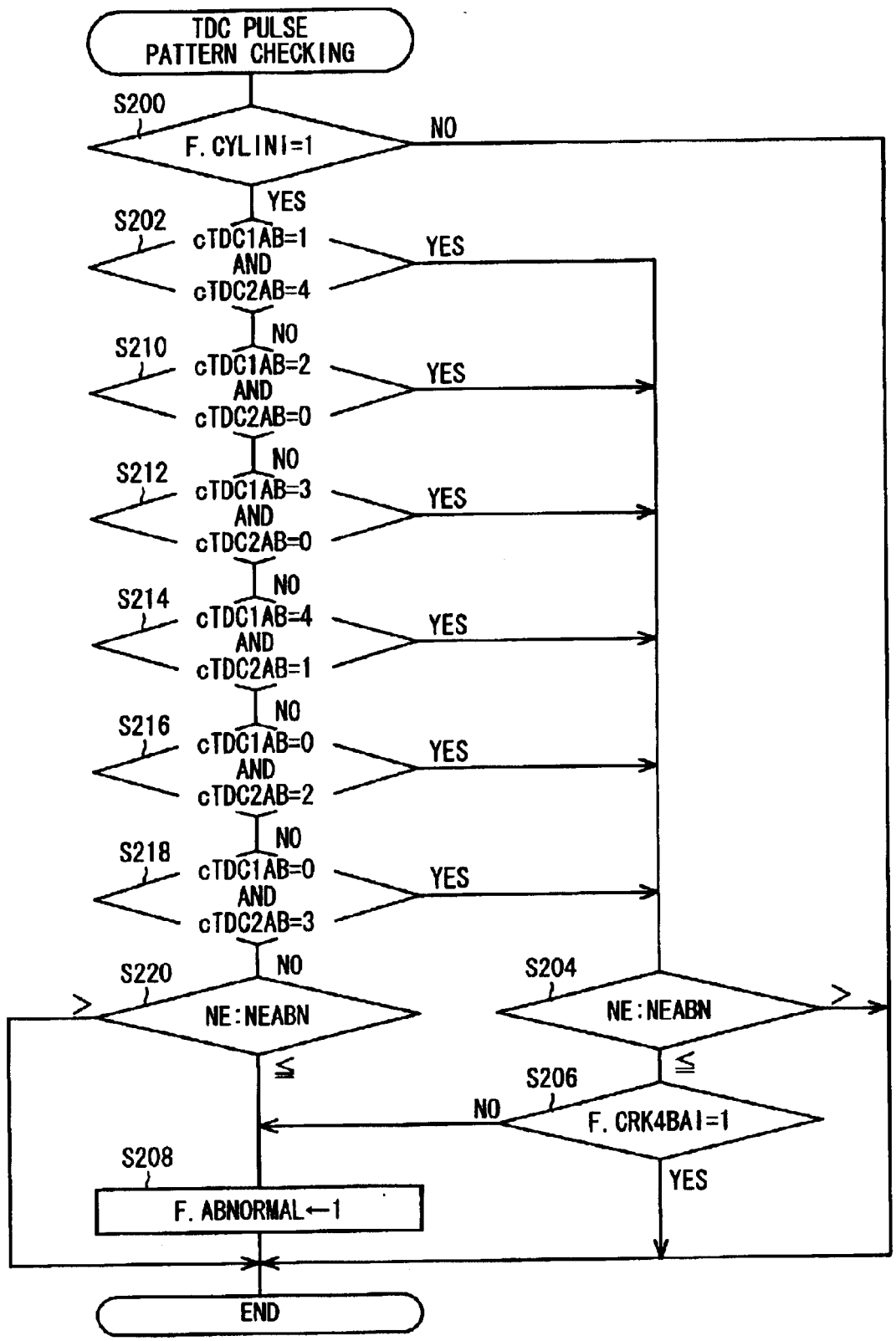
FIG. 8 is a flow chart showing the subroutine of a TDC pulse pattern checking referred to in the flow chart of FIG. 5.

FIG. 8 is a flow chart showing the subroutine of the TDC pulse pattern checking.

The program begins in S200 in which it is again determined whether the bit of the flag F.CYLINI is set to 1 and when the result is negative, the program is terminated. When the result is affirmative, on the other hand, the program proceeds to S202 in which it is determined whether the value of the counter cTDC1AB is 1 and the value of another counter cTDC2AB is 4, in other words it is determined whether the cylinder whose piston is positioned at near the TDC is the 6th cylinder, as understood from the bottom of the time chart of FIG. 6.

When the result is affirmative, the program proceeds to S204 in which the detected engine speed NE is again compared with the predetermined value. When it is determined in S204 that the detected engine speed exceeds the predetermined value, the program is terminated. When it is determined that the detected engine speed is equal to or less than the predetermined value, the program proceeds to S206 in which it is determined whether the bit of the flag F.CRK4BAI is set to 1, in other words it is determined whether the counted number of the crank angle pulses is the multiple of 4.

when result in S206 is affirmative, it is determined that no reverse rotation has happened in the engine 16 and the engine operation is normal.

On the contrary, when the result is negative, it is determined that the engine 16 rotates reverse and the program proceeds to S208 in which the bit of a flag F.ABNORMAL is set to 1. With this, the engine 16 is stopped as will be explained later and no further reverse rotation is prevented.

When the result in S202 is negative, the program proceeds to S210 to S218 in which it is respectively determined whether the cylinder whose piston is positioned at or near the TDC can be identified. When the result is affirmative, the program proceeds to S204.

When the results are negative in all of the steps, the program proceeds to S220 in which the detected engine speed NE is again compared with the predetermined value. When it is determined in S220 that the detected engine speed exceeds the predetermined value, the program is terminated. When it is determined that the detected engine speed is equal to or less than the predetermined value, it is determined that the engine 16 rotates reverse and the program proceeds to S208 in which the bit of the flag F.ABNORMAL is set to 1.

Returning to the explanation of the flow chart of FIG. 5, the program then proceeds to S48 and when it is determined that the detected engine speed is equal to or less than the predetermined value, the program proceeds to S50 in which it is determined whether the bit of the flag F.CRK4BAI is set to 1. when result in S50 is affirmative, it is determined that no reverse rotation has happened in the engine 16 and the engine operation is normal, whereafter the program is terminated. When the result is negative, it is determined that the engine 16 rotates reverse and the program proceeds to S52 in which the bit of the flag F.ABNORMAL is set to 1. This is the same when the result in S44 is affirmative, as explained above.

Figure 9:
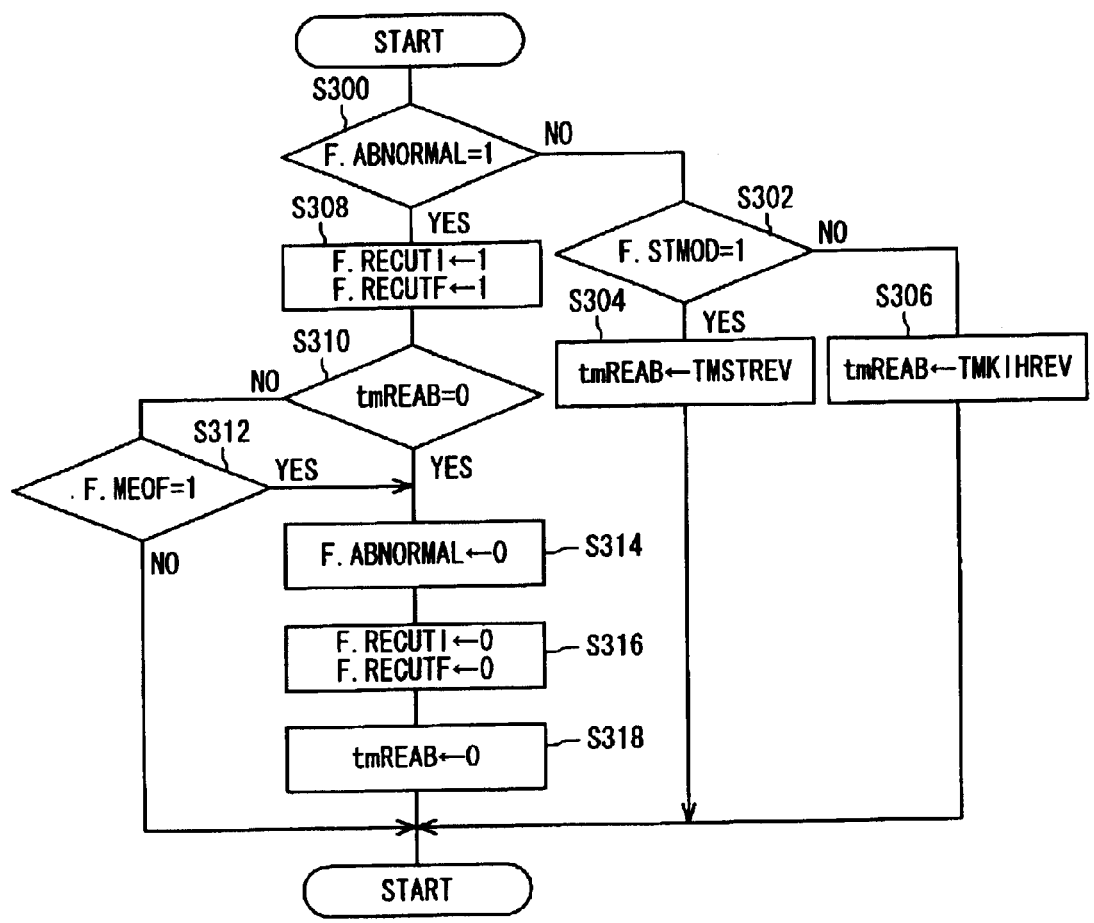
FIG. 9 is a flow chart showing the operation of engine stopping conducted in parallel with the operation shown in the flow chart of FIG. 5.

Then, engine stopping will be explained with reference to FIG. 9. The illustrated program is executed once every predetermined period of time, in parallel with the execution of the program illustrated in FIG. 5.

The program begins in S300 in which it is determined whether the bit of the flag F.ABNORMAL is set to 1 and when the result is negative, the program proceeds to S302 in which it is determined whether the bit of a flag F.STMOD is set to 1. The bit of this flag is set to 1 in a routine (not shown) when the engine 16 is being started.

When the result in S302 is affirmative, the program proceeds to S304 in which a timer tmREAB (down counter which defines a period of time during which the engine 16 is to be stopped) is set with a predetermined value TMSTREV to start counting down. When the result is negative, the program proceeds to S306 in which the timer is set with another predetermined value TMKIHREV to start counting down.

When the result in S300 is affirmative, the program proceeds to S308 in which the bits of an ignition-stop-request flag F.RECUTI and a injection-stop-request flag F.RECUTF are set to 1. With this, in a routine (not shown), the ignition and fuel injection to all of the cylinders (6 cylinders) of the engine 16 are discontinued and the engine 16 is immediately stopped.

The program then proceeds to S310 in which it is determined whether the value of the timer tmREAB has reached zero and if the result is negative, the program proceeds to S312 in which it is determined whether the bit of a flag F.MEOF is set to 1. The bit of this flag is set to 1 in a routine (not shown) when the engine 16 is stopped.

When the result in S312 is negative, the program is terminated. When the result is affirmative, the program proceeds to S314 in which the bit of the flag F.ABNORMAL is reset to 0 since the period of time during which the engine 16 should be stopped has expired. This is the same when the result in S310 is affirmative. The program then proceeds to S316 in which the bits of the flags F.RECUTI, F.RECUTF are reset to 0 and proceeds to S318 in which the timer tmREAB is reset to zero.

Having been configured in the foregoing manner, in the system according to the embodiment, it is determined whether the counted value is the multiple of 4 and if not, it is determined that the engine 16 rotates reverse and the engine 16 is immediately stopped. Thus, it becomes possible to detect the reverse rotation of the 4-cycle, six-cylinder engine 16 accurately and stop it if rotates reverse.

Further, it is determined whether the counted value is the multiple of 4 only when the detected engine speed NE is equal to or greater than the predetermined engine speed NEABN. In other words, the engine reversing detection is limited to an engine speed region where the reversing could possibly occur. With this, the configuration of system is made simple and erroneous detection is less likely to occur.

Thus, the embodiment is configured to have a system for detecting reverse rotation of a 4-cycle internal combustion engine 16 having three or more cylinders for an outboard motor mounted on a boat 12, whose output is connected to a propeller 40 such that the boat is propelled forward or reverse, comprising: cylinder identifying means (ECU 22, sensors 120, 122, S44, S202, S210-S218) for identifying the cylinders of the engine; crank angle pulse generating means (ECU 22, sensor 124) for generating a predetermined number (4) of crank angle signals in a predetermined range of crank angles (120 crank angles); counting means (ECU 22, S28; CRKCA) for counting the number of the crank angle singles; multiple count determining means (ECU 22, S44, S50, S206) for determining whether the counted value is a multiple of the predetermined number (4), when the cylinders are identified; and engine reversing determining means (ECU 22, S42, S44, S48-S52, S206, S208, S220, S300-S318) for determining that engine rotates reverse when the counted value is determined to be not the multiple of the predetermined number and for stopping the engine.

In the system, the multiple count determining means determines whether the counted value is a multiple of the predetermined number, when a speed of the engine is equal to or less than a predetermined speed. The cylinder identifying means includes: a first (TDC) sensor 120 which generates a first signal for the cylinders except for at least one predetermined cylinder at or near a TDC position of each cylinder; and a second (TDC) sensor 122 which generates a second signal for the predetermined cylinder at or near the TDC position; and identifies the cylinders based on the first and second signals.

In the system, the engine has six cylinders, the crank angle pulse generating means generates the four crank angle signals in 120 crank angle degrees and the multiple counting determining means determines whether the counted value is four, and the engine reversing means stops the engine for prescribed periods of time which are different from each other when the engine is being started or not (ECU 22, S302-S306).

It should be noted that, although the engine is stopped by discontinuing both the ignition and fuel injection, it is alternatively possible to discontinue one of them to stop the engine.

It should be noted that, although the invention has been explained with reference to an embodiment of an outboard motor, the invention is not limited in application to an outboard motor but can also be applied to an inboard motor.

The entire disclosure of Japanese Patent Application No. 2001-315852 filed on Oct. 12, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting reverse rotation of a 4-cycle internal combustion engine having three or more cylinders for an outboard motor mounted on a boat, whose output is connected to a propeller such that the boat is propelled forward or reverse, comprising:

cylinder identifying means for identifying the cylinders of the engine;

crank angle pulse generating means for generating a predetermined number of crank angle signals in a predetermined range of crank angles;

counting means for counting the number of the crank angle singles;

multiple count determining means for determining whether the counted value is a multiple of the predetermined number, when the cylinders are identified; and engine reversing determining means for determining that engine rotates reverse when the counted value is determined to be not the multiple of the predetermined number and for stopping the engine.

2. A system according to claim 1, wherein the multiple count determining means determines whether the counted value is a multiple of the predetermined number, when a speed of the engine is equal to or less than a predetermined speed.

3. A system according to claim 1, wherein the cylinder identifying means includes:

a first sensor which generates a first signal for the cylinders except for at least one predetermined cylinder at or near a TDC position of each cylinder; and a second sensor which generates a second signal for the predetermined cylinder at or near the TDC position;

and identifies the cylinders based on the first and second signals.

4. A system according to claim 1, wherein the engine has six cylinders, the crank angle pulse generating means generates the four crank angle signals in 120 crank angle degrees and the multiple counting determining means determines whether the counted value is four.

5. A system according to claim 1, wherein the engine reversing means stops the engine for prescribed periods of time which are different from each other when the engine is being started or not.

6. A method of detecting reverse rotation of a 4-cycle internal combustion engine having three or more cylinders for an outboard motor mounted on a boat, whose output is connected to a propeller such that the boat is propelled forward or reverse, comprising the steps of:

identifying the cylinders of the engine;

generating a predetermined number of crank angle signals in a predetermined range of crank angles;

counting the number of the crank angle singles;

determining whether the counted value is a multiple of the predetermined number, when the cylinders are identified; and determining that engine rotates reverse when the counted value is determined to be not the multiple of the predetermined number and for stopping the engine.

7. A method according to claim 6, wherein the multiple count determining means determines whether the counted value is a multiple of the predetermined number, when a speed of the engine is equal to or less than a predetermined speed.

8. A method according to claim 6, wherein the step of cylinder identifying means includes the steps of:

generating a first signal for the cylinders except for at least one predetermined cylinder at or near a TDC position of each cylinder; and generating a second signal for the predetermined cylinder at or near the TDC position;

and identifies the cylinders based on the first and second signals.

9. A method according to claim 6, wherein the engine has six cylinders, the step of crank angle pulse generating generates the four crank angle signals in 120 crank angle degrees and the step of multiple counting determining determines whether the counted value is four.

10. A method according to claim 6, wherein the step of engine reversing stops the engine for prescribed periods of time which are different from each other when the engine is being started or not.

* * * * *

UNITED STATES PATENT AND TRADEMARK OFFICE
CERTIFICATE OF CORRECTION

PATENT NO. : 6,810,724 B2
DATED : November 2, 2004
INVENTOR(S) : Ryuichi Kimata et al.

It is certified that error appears in the above-identified patent and that said Letters Patent is hereby corrected as shown below:

Column 2,
Line 7, please correct "singles" into -- signals --.

Column 10,
Line 31, please correct "singles" into -- signals --.

Column 11,
Line 21, please correct "singles" into -- signals --.

Column 12,
Line 15, please correct "singles" into -- signals --.

Signed and Sealed this

Seventh Day of June, 2005

JON W. DUDAS
*Director of the United States Patent and Trademark Office*